(12) United States Patent
Park et al.

(10) Patent No.: US 9,356,809 B2
(45) Date of Patent: May 31, 2016

(54) METHOD AND APPARATUS FOR PERFORMING COMMUNICATION IN MULTI-STAGE BEAM FORMING SYSTEM

(71) Applicants: Samsung Electronics Co., Ltd., Gyeonggi-do (KR); Korea Advanced Institute of Science and Technology, Daejeon (KR)

(72) Inventors: Jeong-Ho Park, Seoul (KR); Yong-Hoon Lee, Daejeon (KR); Minhyun Kim, Busan (KR); Seongjin Kim, Daejeon (KR); Ji-Yun Seol, Gyeonggi-do (KR); Eui-Tae Hwang, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/265,219

(22) Filed: Apr. 29, 2014

(65) Prior Publication Data
US 2014/0321563 A1 Oct. 30, 2014

(30) Foreign Application Priority Data
Apr. 29, 2013 (KR) ........................ 10-2013-0047342

(51) Int. Cl.
| | | |
|---|---|---|
| *H04L 1/06* | (2006.01) | |
| *H04L 25/03* | (2006.01) | |
| *H04B 7/04* | (2006.01) | |
| *H04B 7/06* | (2006.01) | |

(52) U.S. Cl.
CPC ........ *H04L 25/03898* (2013.01); *H04B 7/0482* (2013.01); *H04B 7/0626* (2013.01)

(58) Field of Classification Search
CPC ..... H04L 1/0618; H04L 1/06; H04L 27/2647; H04L 7/0626; H04B 7/0417; H04B 7/0845; H04B 7/2628; H04B 7/0669; H04B 7/0617; H04B 7/0482; H04W 16/28; H04W 52/42
See application file for complete search history.

(56) References Cited

U.S. PATENT DOCUMENTS

| | | |
|---|---|---|
| 2004/0242156 A1 | 12/2004 | Tiirola et al. |
| 2009/0033555 A1 | 2/2009 | Niu et al. |
| 2009/0298424 A1 | 12/2009 | Liu et al. |

(Continued)

OTHER PUBLICATIONS

International Search Report dated Jul. 28, 2014 in connection with International Application No. PCT/KR2014/003561, 3 pages.

(Continued)

*Primary Examiner* — Ted Wang (57) ABSTRACT

A method for performing communication in a multi-stage beam forming system includes determining statistical channel information which indicates a priority of analog beams transmitted by a base station, configuring an adaptive code book for digital beam forming, based on the statistical channel information and analog beams which the base station uses in actual communication among the analog beams, and performing communication with the base station through the digital beam forming based on the adaptive code book. A terminal includes a channel estimator configured to perform channel estimation for analog beams transmitted from a base station, a controller configure to determine statistical channel information indicating a priority of the analog beams, and configure an adaptive code book for digital beam forming based on the statistical channel information and analog beams that the base station uses in actual communication among the analog beams, and a communication unit.

24 Claims, 7 Drawing Sheets

(56) References Cited

U.S. PATENT DOCUMENTS

| | | |
|---|---|---|
| 2010/0056216 A1 | 3/2010 | Li et al. |
| 2011/0056216 A1* | 3/2011 | Edwards ............... F25D 3/107 62/7 |
| 2011/0080964 A1* | 4/2011 | Shamsi ............... H04B 7/0417 375/260 |
| 2012/0322362 A1 | 12/2012 | Coon |
| 2013/0039401 A1 | 2/2013 | Han et al. |
| 2013/0301454 A1* | 11/2013 | Seol et al. ..................... 370/252 |
| 2014/0050280 A1* | 2/2014 | Stirling-Gallacher ............ H04B 7/0486 375/296 |

OTHER PUBLICATIONS

Written Opinion of the International Searching Authority dated Jul. 28, 2014 in connection with International Application No. PCT/KR2014/003561, 4 pages.

* cited by examiner

METHOD AND APPARATUS FOR PERFORMING COMMUNICATION IN MULTI-STAGE BEAM FORMING SYSTEM

CROSS-REFERENCE TO RELATED APPLICATION AND CLAIM OF PRIORITY

The present application is related to and claims the priority under 35 U.S.C. §119(a) to Korean Patent Application Serial No. 10-2013-0047342, which was filed in the Korean Intellectual Property Office on Apr. 29, 2013, the entire content of which is hereby incorporated by reference.

TECHNICAL FIELD

The present disclosure relates to a transmission and reception of a signal in a wireless communication system, and more particularly to a method and apparatus for transmitting and receiving a radio signal in a multi-stage beam forming system.

BACKGROUND

A cellular wireless communication system can be configured of a multi-stage beam forming system such as a beam division multiple access (BDMA) system. As an example, multi-stage beam forming can include digital beam forming and analog beam forming using a directional antenna. In a typical communication environment, the analog beam forming is operated prior to the digital forming, and thus a status of a channel in which the digital beam forming is performed is affected by the analog beam forming which is performed prior to the digital beam forming. Accordingly, in the digital beam forming, it is necessary to consider a design and an operational condition of the analog beam forming which is a front end of the digital beam forming.

Like in the typical communication system, the digital beam forming of the multi-stage beam forming system is operated based on channel information. Accordingly, a receiver reports information on a change of a channel environment according to an operation of the analog beam forming to a transmitter.

Channel estimation for the digital beam forming is very limited due to its characteristic. For example, when the number of radio frequency chains of a digital stage is small compared to the number of antennas of an analog stage, it is very difficult to obtain channel information on all antennas of the analog stage. In this circumstance, the obtained channel information can limit an operation of front-end beam forming, and also cannot provide a statistical characteristic of the channel environment for an operation of the digital stage.

For the beam forming of the digital stage, a channel information feedback configuration based on a code book shared by the transmitter and the receiver may be used. Here, a term "code book" means a set of candidates of pre-coding matrixes used for the beam forming of the digital stage. It is necessary to adaptively design the code book so as to adjust the code book to the channel environment. However, in the conventional art, because a multi-stage beam forming environment is not considered, the design of the code book is not associated with the operation of the front-end beam forming such as the analog beam forming. Particularly, there is a problem in that the conventional art cannot provide the adaptive design of the code book to which the operational condition of the beam forming is applied.

SUMMARY

To address the above-discussed deficiencies, it is a primary object to provide a method and an apparatus for transmitting/ receiving a signal in a communication system.

Another aspect of the present disclosure is to provide a method and an apparatus for generating and transmitting channel feedback information necessary for beam forming of a transmitter in a multi-stage beam forming system.

Still another aspect of the present disclosure is to provide a method and an apparatus for designing and operating a code book necessary for a channel information feedback of digital beam forming.

Still another aspect of the present disclosure is to provide a method and an apparatus for configuring a code book for digital beam forming in consideration of channel estimation of analog beam forming.

Still another aspect of the present disclosure is to provide a method and apparatus for performing digital beam forming in consideration of a change of a channel environment according to analog beam forming.

In accordance with an aspect of the present disclosure, a method of performing communication in a multi-stage beam forming system is provided. The method includes determining statistical channel information which indicates a priority of analog beams transmitted by a base station, configuring an adaptive code book for digital beam forming, based on the statistical channel information and analog beams which the base station uses in actual communication among the analog beams, and performing communication with the base station through the digital beam forming based on the adaptive code book.

In accordance with another aspect of the present disclosure, a method of performing communication in a multi-stage beam forming system is provided. The method includes determining statistical channel information which indicates a priority of analog beams transmitted by a base station, configuring an adaptive code book for digital beam forming, based on the statistical channel information and analog beams which the base station uses in actual communication among the analog beams, and performing communication with a terminal through the digital beam forming based on the adaptive code book.

In accordance with still another aspect of the present disclosure, a terminal for performing communication in a multi-stage beam forming system is provided. The terminal includes; a channel estimation unit which performs channel estimation for analog beams transmitted from a base station; a controller which determines statistical channel information indicating a priority of the analog beams, and configures an adaptive code book for digital beam forming based on the statistical channel information and analog beams which the base station uses in actual communication among the analog beams; and a communication unit which communicates with the base station through the digital beam forming based on the adaptive code book.

In accordance with still another aspect of the present disclosure, a base station for a multi-stage beam forming system is provided. The base station includes a controller which determines statistical channel information indicating a priority of analog beams transmitted from the base station, and configures an adaptive code book for digital beam forming based on the statistical channel information and analog beams which the base station uses in actual communication among the analog beams; and a beam forming unit which communicates with a terminal through the digital beam forming based on the adaptive code book.

Before undertaking the DETAILED DESCRIPTION below, it may be advantageous to set forth definitions of certain words and phrases used throughout this patent document; the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged telecommunication technologies. Hereinafter, a preferred embodiment of the present disclosure will be described with reference to the accompanying drawings. Further, in the following description of the present disclosure, a detailed description of known functions and configurations incorporated herein will be omitted when it may make the subject matter of the present disclosure rather unclear. The terms which will be described below are terms defined in consideration of the functions in the present disclosure, and may be different according to users, intentions of the users, or customs. Therefore, the definition needs to be determined based on the overall contents of the present specifications.

Hereinafter, a beam division multiple access (BDMA) system including a plurality of analog antennas and a plurality of digital chains according to the embodiments of the present disclosure will be described. However, the present disclosure is not limited to such a system, and it is understood by those skilled in the art that the embodiments of the present disclosure described later can be easily applied to a multi-stage beam forming system including a plurality of beam forming stages.

Hereinafter, a technology of generating and feeding back channel information necessary for design of a code book for digital beam forming of a transmitter in a receiver will be described. Particularly, the receiver more efficiently configures channel information required for the digital beam forming of the transmitter utilizing multi-stage beam forming, considering a change of a channel environment according to an operation of the analog beam forming. The channel information fed back by the receiver is affected by a change of the channel environment according to a beam coefficient setting of the analog beam forming. Particularly, the channel information may have a statistical characteristic of a channel required to design the code book.

Further, a technology in which the transmitter and the receiver adaptively configure a code book for use in the digital beam forming based on identical channel information will be described. The code book is determined by using the statistical characteristic of the channel which the receiver estimates based on the analog beam forming.

Figure 1:
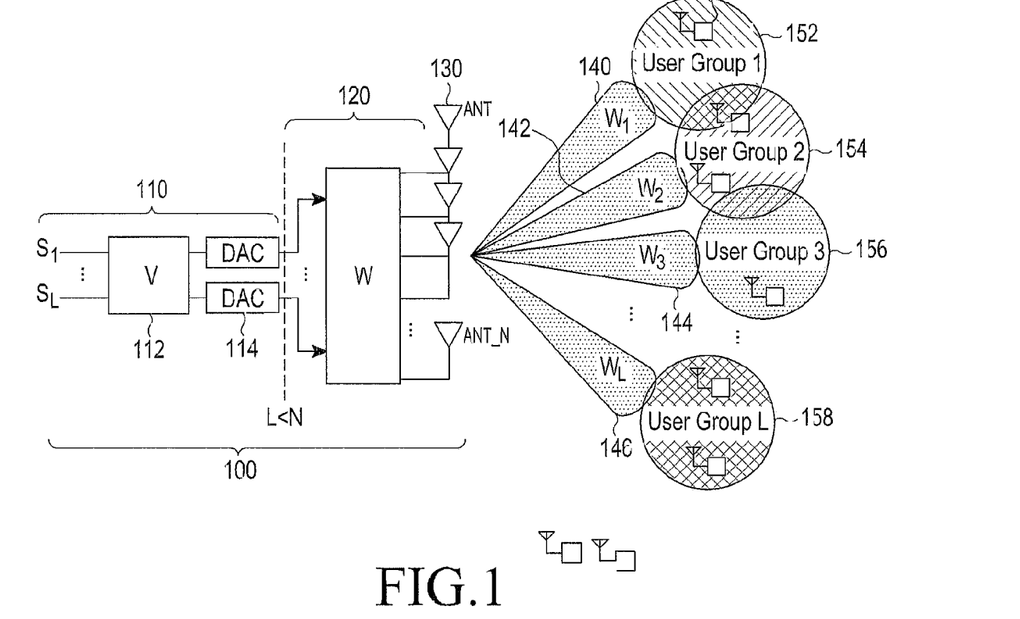
FIG. 1 is a view illustrating an example of a multi-stage beam forming system according to an embodiment of the present disclosure.

FIG. 1 is a view illustrating an example of a multi-stage beam forming system according to embodiments of the present disclosure. Here, although examples of one transmitter 100 and a plurality of receivers 150 located in a service area, i.e., cell, are shown, the transmitter 100 can represent a base station, and the receivers 150 can represent terminals.

Referring to FIG. 1, the transmitter 100 is configured to include a first stage beam forming unit 110, a second stage beam forming unit 120, and an antenna unit 130 including a plurality of antennas. The first stage beam forming unit 110, for example, can be constituted of a digital beam former, and a second stage beam forming unit 120, for example, can be constituted of an analog beamformer.

The first stage beam forming unit 110 includes a pre-coder for receiving an input of L information streams $S_1, S_2, \ldots, S_L$, and pre-coding the information streams by using a pre-coding matrix V obtained by utilizing channel information received from a predefined code book, so as to generate a plurality of pre-coded streams, and a plurality of radio frequency chains for modulating and outputting the plurality of pre-coded streams. The modulated streams are transmitted through digital to analog converters (DACs) 114 to the second stage beam forming unit 120.

The second stage beam forming unit 120 receives an input of analog signals from the plurality of DACs, and performs beam forming for the analog signals by using an analog beam forming matrix W constituted of beam forming coefficient vectors for analog beam forming. The signals subjected to the beam forming are carried on L analog beams 140, 142, 144 and 146 and emitted in air through N antennas.

The analog beams 140, 142, 144 and 146 emitted from the transmitter 100 can arrive at a plurality of receivers 150. The receivers 150 are classified in L user groups 152, 154, 156 and 158 corresponding to the analog beams 140, 142, 144 and 146 respectively. That is, at least one receiver belonging to an $i^{th}$ user group receives a signal through an $i^{th}$ analog beam from the transmitter 100. For example, the user groups 152, 154, 156 and 158 can be configured based on information on preferable beams reported by each receiver 150. That is, each receiver 150 selects at least one preferable beam from analog beams, and transmits the information on the selected preferable beam to the transmitter 100. The transmitter 100 classifies the receivers into groups, based on the information on the preferable beam received from the receivers. Particularly, each receiver is classified into a user group corresponding to its most preferable beam.

Each receiver 150 can receive a signal from the transmitter 100 by using one or more receiving antennas. In the case of including a plurality of receiving antennas, the receiver 150 detects a signal using a multiple input multiple output (MIMO) scheme. In the case of including a single receiving antenna, the receiver 150 detects a signal using a multiple input single output (MISO) scheme.

The receiver 150 detects a desired signal among signals transmitted by the transmitter 100, based on the analog beam forming matrix W and the pre-coding matrix V used in the transmitter 100.

The pre-coding matrix applied to the digital beam forming in the transmitter 100 is determined based on a code book shared by the transmitter 100 and the receiver 150. The receiver 150 performs channel estimation based on a training signal, i.e., a reference signal (RS) transmitted by the transmitter 100, selects one pre-coding matrix from a code book according a result of the channel estimation, and feeds back a pre-coding matrix indicator or index (PMI) which indicates the selected pre-coding matrix (or pre-coding vector). The transmitter 100 determines the pre-coding vector applied to the digital beam forming of the signal for the receiver 150, based on the PMI fed back by the receiver 150.

Hereinafter, a scheme of designing the code book for the digital beam forming according to the embodiment of the present disclosure will be described.

Information on the analog beam forming matrix for the analog beam forming of the multi-stage beam forming is shared by the transmitter and the receiver. As an embodiment, the transmitter can update and transmit the analog beam forming matrix to the receiver periodically or aperiodically. As another embodiment, the transmitter and the receiver store the analog beam forming matrix set by a system operator or a manufacturer in an internal memory.

The following Equation 1 expresses the analog beam forming matrix shared by the transmitter and the receiver.

$$W = [w_1, w_2, \ldots, w_{Ntraining}] \quad (1)$$

where $w_n$ is an analog beam forming coefficient related to an $n^{th}$ analog beam.

The code book used for the digital beam forming can be designed periodically or aperiodically, based on channel information fed back by the receiver. The channel information used for the design of the code book is obtained by measuring training analog beams transmitted by the transmitter. The transmitter transmits a training signal, i.e., a reference signal, through N training analog beams so that the receiver estimates the channel information. According to the embodiment, the training analog beams can be transmitted periodically for the update of the code book. According to the embodiment, the number of the training analog beams is identical to the number L of the RF chains, or can be smaller than or larger than the number L of the RF chains.

The receiver performs the channel estimation based on the training analog beams received from the transmitter, and obtains a beam channel quality indication (beam CQI, or B.CQI).

Beam CQU information, for example, can be a matrix expressed by the following Equation 2.

$$B.CQI;D = \text{diag}[d_1, d_2, \ldots, d_{Ntraining}] \quad (2)$$

where $d_i$ constituting the beam CQI information indicates a beam gain (intensity of a received signal) for an $i^{th}$ analog beam $w_i$.

In a communication system such as Long-Term Evolution (LTE) based on Orthogonal Frequency Division Multiple Access (OFDMA), a reference signal (RS) is inserted in a whole available frequency band of a corresponding cell, and the receiver obtains B.CQI by measuring and averaging a channel characteristic for the received reference signal. According to another embodiment, the receiver can obtain a B.CQI by averaging a channel characteristic of a reference signal in a time region.

A beam gain $d_i$ for a specific analog beam can be expressed by the following Equation 3.

$$d_i = \frac{1}{T} \sum_{t=1}^{T} (h_t^i)^* h_t^i \quad (3)$$

where $h_t^i$ means a measured channel impulse response to the $i^{th}$ analog beam, and T means a number of subcarriers included in a frequency band to be averaged, or a length of a time region.

Alternatively, beam preference information instead of channel information can be used as information necessary for design of a code book. The beam preference information is created based on times at which the receivers select each beam. The beam preference information K is expressed by the following Equation 4.

$$K = [k_1, k_2, \ldots, k_{Ntraining}] \quad (4)$$

$$k_i = \frac{1}{K_{feedback}} \Sigma N_{preferred}$$

where, $k_i$ is an average value meaning times at which at least one receiver selects the $i^{th}$ analog beam as a preferred beam, $N_{preferred}$ means times at which the $i^{th}$ analog beam is selected as a preferred beam during $K_{feedback}$, and $K_{feedback}$ indicates a desired time.

The receiver selects at least one preferred beam from the training analog beams received from the transmitter based on the measured channel information, and counts times at which each analog beam is selected, so as to determine the beam preference information K. Further, the transmitter counts times of selecting each analog beam based on information on the preferred beam reported from each receiver for a desired time, resulting in a determination of the beam preference information K identical to that in the receiver. In another embodiment, the transmitter or the receiver can transmit the determined beam preference information to a partner, and share the identical beam preference information. Statistical channel information used for the design of the code book indicates a priority for all analog beams transmitted by the transmitter, and according to the embodiment, can be determined based on at least one of the CQI information and the beam preference information described above.

Statistical information R of a channel determined by using beam CQI information D is expressed by the following Equation 5.

$$R = G(WDW^H) \quad (5)$$

Statistical information R of a channel determined by using beam preference information K is expressed by the following Equation 6.

$$R = G(WKW^H) \quad (6)$$

where, H indicates a conjugate transpose, G means a Gram Schmidt Orthogonalization operation, and W denotes the analog beam forming matrix described above.

Figure 2:
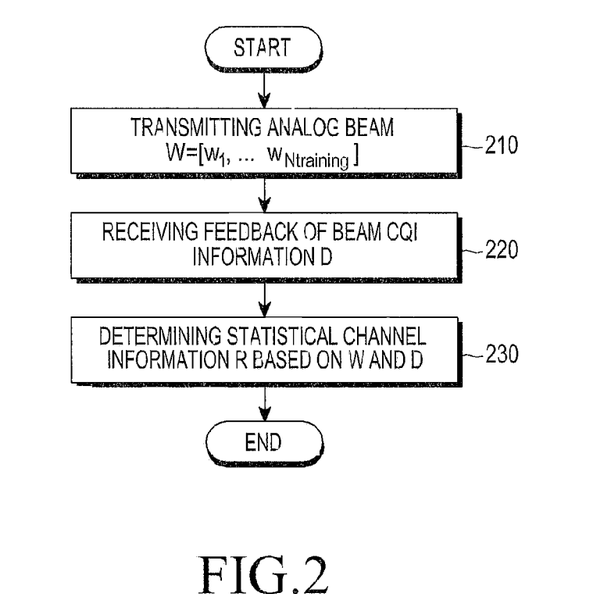
FIG. 2 is a flowchart illustrating a process of determining statistical channel information for use in design of a code book in a base station according to the embodiment of the present disclosure.

FIG. 2 is a flowchart illustrating a process of determining statistical channel information for use in design of a code book in a base station according to embodiments of the present disclosure.

Referring to FIG. 2, in step 210, the base station transmits the reference signal through N analog beams. The analog beams are formed based on the analog beam forming matrix W including analog beam forming coefficients. In the embodiment, the base station can notify terminals in the cell of information on the analog beam forming matrix W in advance. In another embodiment, the information on the analog beam forming matrix W is determined by a superordinate network object, and can be notified to the base station and the terminals. In still another embodiment, the information on the analog beam forming matrix W can be stored in the base station and the terminals by a system operator or a manufacturer.

In step 220, the base station receives measured beam CQI information D of the analog beams from the terminal. Alternatively, the base station determines beam preference information K of the analog beams based on information on a preference beam reported by the terminal. Alternatively, the base station obtains the beam preference information K from the terminal.

In step 230, the base station determines statistical channel information R each time when the beam CQI information is received, or by a predetermined period, based on the analog beam forming matrix W and the beam CQI information D. As an embodiment, the statistical channel information R can be calculated by Equation 5. Alternatively, the statistical channel information R can be calculated by Equation 6, based on the beam preference information K.

Figure 3:
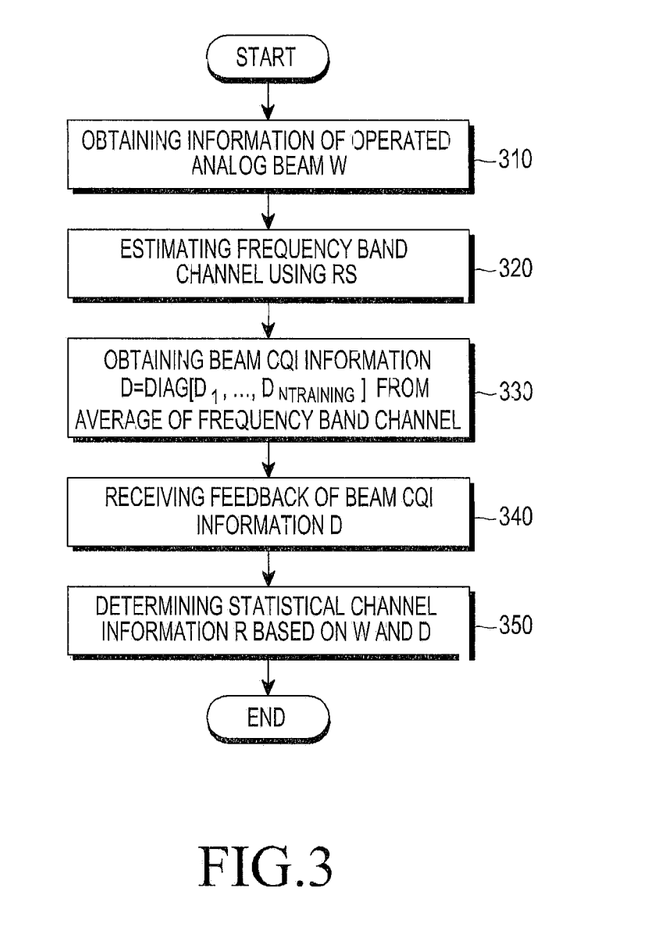
FIG. 3 is a flowchart illustrating a process of determining statistical channel information for use in design of a code book in a terminal according to the embodiment of the present disclosure.

FIG. 3 is a flowchart illustrating a process of determining statistical channel information for use in design of a code book in a terminal according to embodiments of the present disclosure.

Referring to FIG. 3, in step 310, the terminal obtains information on the analog beam forming matrix W of the analog beams operated by the base station from the base station. Alternatively, the terminal can obtain the analog beam forming matrix W from a superordinate network object or an internal memory.

In step 320, the terminal performs channel estimation of a frequency band for each of the analog beams by using the reference signal transmitted by the base station, and in step 330, the terminal determines the beam CQI information D for the analog beams based on the result of the channel estimation. In step 340, the beam CQI information D is fed back from the terminal to the base station. Alternatively, the terminal selects the preference beam based on the channel estimation for the analog beams, and determines the beam preference information K for the analog beams based on the result of the selection for a desired time. The information on the selected preference beam or the beam preference information K can be fed back from the terminal to the base station.

In step 350, the base station determines statistical channel information R each time when the reference signal is received from the base station or by a predetermined period, based on the analog beam forming matrix W and the beam CQI information D. As an embodiment, the statistical channel information R can be calculated by Equation 5. Alternatively, the statistical channel information R can be calculated by Equation 6, based on the beam preference information K.

Hereinafter, an adaptive design of the code book for the digital beam forming will be described.

The terminal and the base station have a code book $C_{common}$ for common use, which is set by the system operator or the manufacturer, and update the code book for common use based on the statistical channel information, so as to determine the adaptive code book.

The code book for common use is expressed by the following Equation 7.

$$C_{common} = [c_1, c_2, \ldots c_M] \quad (7)$$

where the code book $C_{common}$ for common use includes the M number of vector code words, $C_m$ is an $m^{th}$ vector code word which means a pre-coding vector with a length of L. The length L of the vector code words is determined according to the number of the RF chains of the digital beam forming unit.

The adaptive code book is configured by using the statistical channel information R and the common code book described above. The adaptive code book $C_{adaptive}$ is expressed by the following Equation 8.

$$C_{adpative} = fN(R_{adaptive}^{1/2} C_{common})$$
$$R_{adaptive} = W_{used}^H R W_{used} \quad (8)$$

wherein, $W_{used}$ means analog beam forming coefficients for the analog beam which the base station actually uses for communication, which is identical to or different from W used in the estimation of the statistical channel information.

As an example, the $W_{used}$ can be constituted of a sub-matrix including some columns corresponding to the analog beams actually used for communication with the terminals among the columns of W. Further, fN means a normalization function which is used for normalizing the magnitude of the vector code words.

As described above, the statistical channel information R is converted into adaptive channel information $R_{adaptive}$ in consideration of the analog beam forming coefficients $W_{used}$ actually used for the communication, and then applied to the design of the adaptive code book.

Figure 4:
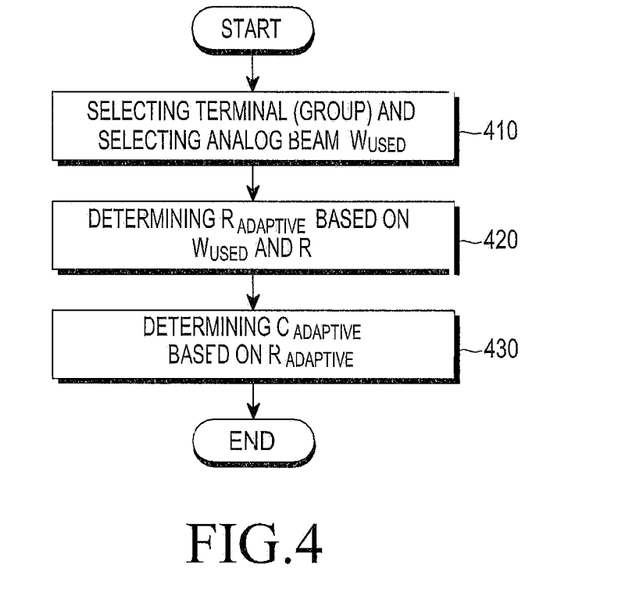
FIG. 4 is a flowchart illustrating a process of designing a code book in a base station according to the embodiment of the present disclosure.

FIG. 4 is a flowchart illustrating a process of designing a code book in a base station according to embodiments of the present disclosure.

Referring to FIG. 4, in step 410, the base station selects at least one terminal or a terminal group for actually performing a transmission by performing a scheduling based on the channel information reported by the terminals in the cell, selects at least one analog beam used for the transmission to the selected terminal (group), and determines the analog beam forming matrix $W_{used}$ based on the at least one selected analog beam. As an embodiment, the base station can notify corresponding terminals in the cell of information on the analog beam forming matrix W. Alternatively, the base station notifies the corresponding terminals of information on the at least one selected analog beam, so as to allow each corresponding terminal to create the used analog beam forming matrix $W_{used}$.

In step 420, the base station determines adaptive channel information $R_{adaptive}$ based on the used analog beam forming $W_{used}$ and the determined statistical channel information R. Then, in step 430, the base station determines an adaptive code book $C_{adaptive}$ from the common code book $C_{common}$ by using the adaptive channel information $R_{adaptive}$. As an embodiment, the adaptive code book can be configured by applying elements of each beam corresponding to the adaptive channel information $R_{adaptive}$ to each vector code word of the common code book. Alternatively, the base station selects at least a part of the vector code words of the common code book and updates the selected vector code word in consideration of the elements of each beam corresponding to the adaptive channel information $R_{adaptive}$, so as to constitute the adaptive code book. In addition, various embodiments and algorithms can be applied for adaptation of the code book, and the present disclose does not limit a detailed method.

Figure 5:
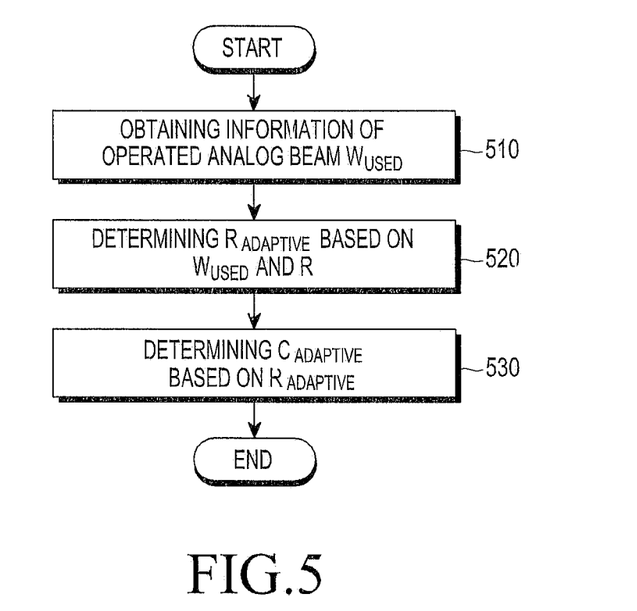
FIG. 5 is a flowchart illustrating a process of designing a code book in a terminal according to the embodiment of the present disclosure.

FIG. 5 is a flowchart illustrating a process of designing a code book in a terminal according to an embodiment of the present disclosure.

Referring to FIG. 5, in step 510, the terminal acquires information of the used analog beam forming matrix $W_{used}$ including the analog beam forming coefficient for at least one analog beam actually used for the communication. As an embodiment, the terminal reports information on the preferred beam to the base station, and then receives information on the used analog beam forming matrix $W_{used}$ from the base station. Alternatively, the terminal directly creates the used analog beam forming matrix $W_{used}$ based on information on at least one analog beam which the base station or the terminal selects so that the terminal uses the analog beam.

In step 520, the terminal determines adaptive channel information $R_{adaptive}$ based on the used analog beam forming $W_{used}$ and the determined statistical channel information R. Then, in step 530, the terminal determines an adaptive code book $C_{adaptive}$ from the common code book $C_{common}$ by using the adaptive channel information $R_{adaptive}$. The adaptive code book must be configured by using an algorithm identical to that used in the base station.

Figure 6:
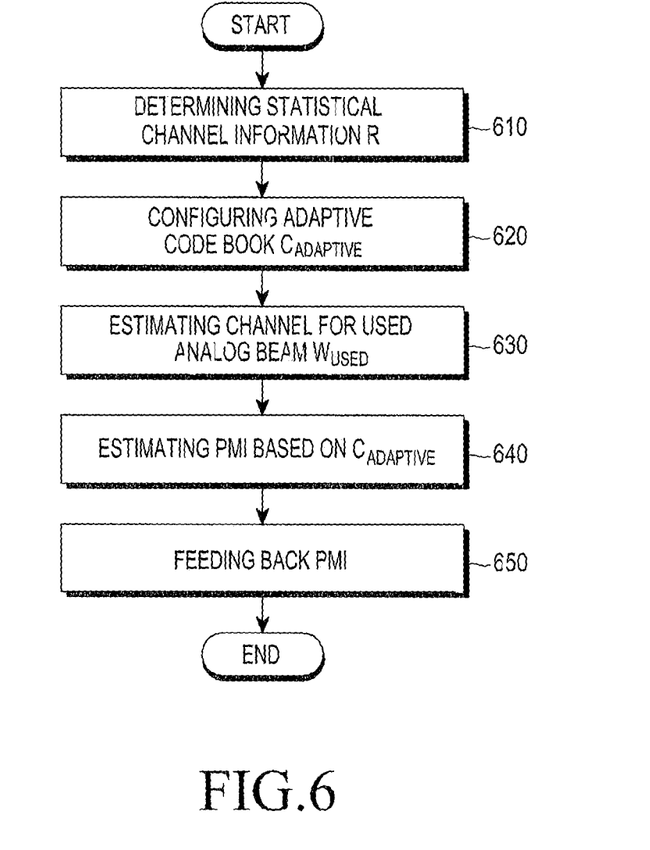
FIG. 6 is a flowchart illustrating a communication process in a terminal based on an adaptive code book according to the embodiment of the present disclosure.

FIG. 6 is a flowchart illustrating a communication process in a terminal based on an adaptive code book according to an embodiment of the present disclosure.

Referring to FIG. 6, in step 610, the terminal determines statistical channel information based on analog beams transmitted by the base station. The statistical channel information can be determined, for example, based on beam CQI information, or beam preference information and beam forming coefficients of all analog beams. In step 620, the terminal configures the adaptive code book based on the statistical channel information and actually used analog beam forming coefficients.

In step 630, the terminal performs channel estimation for the at least one used analog beam Wused, which is scheduled by the base station, and determines effective channel information. The effective channel information for each analog beam can have a length corresponding to the number of the RF chains of the base station.

FIG. 6 is a flowchart illustrating a communication process in a terminal based on an adaptive code book according to an embodiment of the present disclosure.

Referring to FIG. 6, in step 610, the terminal determines statistical channel information based on analog beams transmitted by the base station. The statistical channel information can be determined, for example, based on beam CQI information, or beam preference information and beam forming coefficients of all analog beams. In step 620, the terminal configures the adaptive code book based on the statistical channel information and actually used analog beam forming coefficients.

In step 630, the terminal performs channel estimation for the at least one used analog beam Wused, which is scheduled by the base station, and determines effective channel information. The effective channel information for each analog beam can have a length corresponding to the number of the RF chains of the base station.

In step 630, the terminal performs channel estimation for the at least one used analog beam $W_{used}$ which is scheduled by the base station, and determines effective channel information. The effective channel information for each analog beam can have a length corresponding to the number of the RF chains of the base station.

In step 640, the terminal selects at least one PMI indicating at least one suitable vector code word from the predefined adaptive code book Cadaptive, based on the determined effective channel information. In step 650, the selected PMI is fed back to the base station by using a prescribed format and channel.

Figure 7:
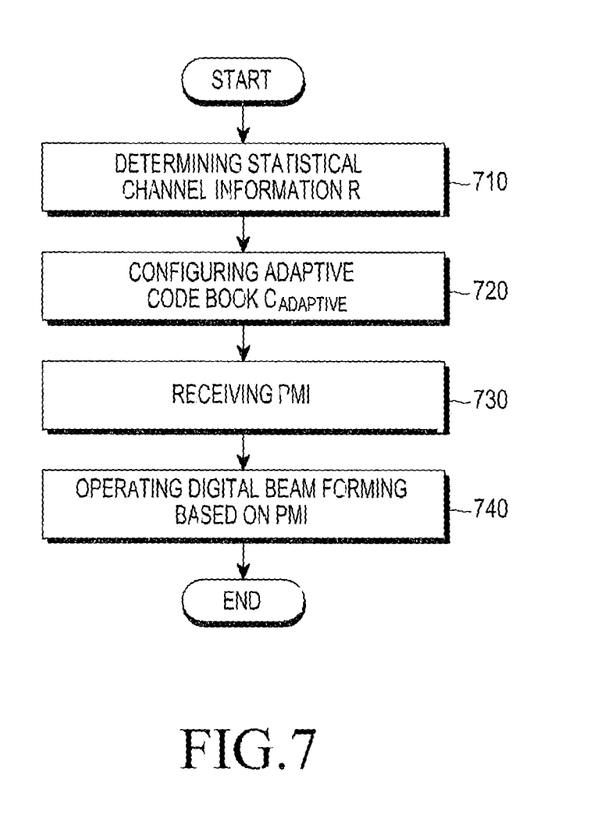
FIG. 7 is a flowchart illustrating a communication process in a base station based on an adaptive code book according to the embodiment of the present disclosure.

FIG. 7 is a flowchart illustrating a communication process in a base station based on an adaptive code book according to the embodiment of the present disclosure.

Referring to FIG. 7, in step 710, the base station determines statistical channel information based on feedback information on transmitted analog beams. The statistical channel information can be determined, for example, based on beam CQI information, or beam preference information and beam forming coefficients of all analog beams. In step 720, the base station configures the adaptive code book based on the statistical channel information and analog beam forming coefficients actually used for communication.

In step 730, the base station receives the feedback information, which includes one PMI indicating one vector code word of the adaptive code book Cadaptive, from the terminal. In step 740, the base station performs digital beam forming for a signal transmitted to the terminal, based on the PMI.

Figure 8:
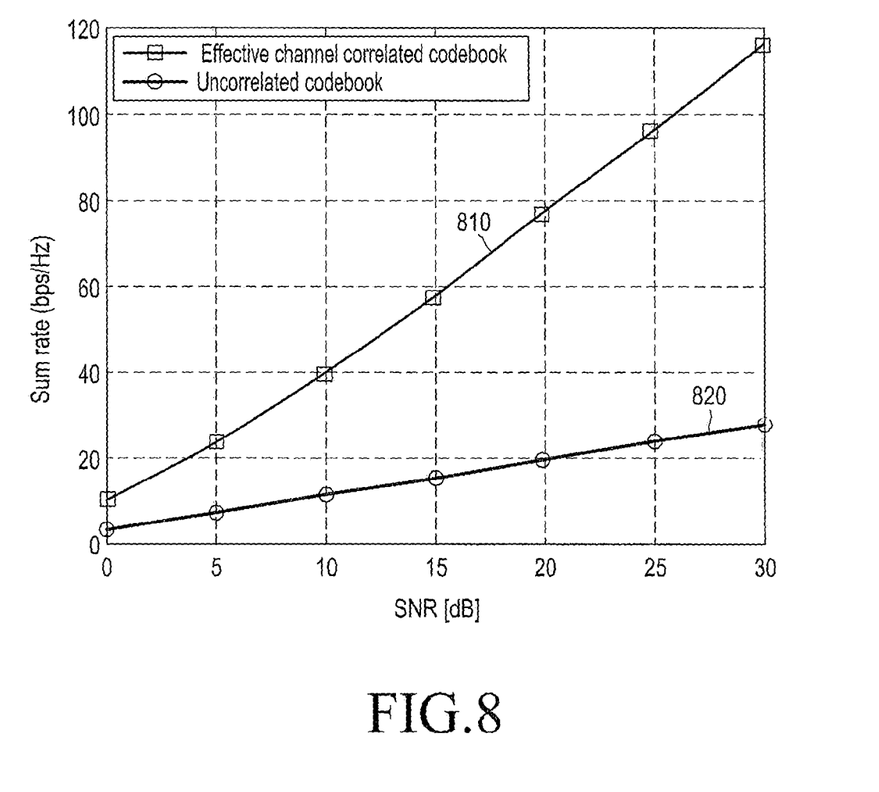
FIG. 8 is a graph illustrating a result of simulation according to the embodiment of the present disclosure, in which a performance gain of the adaptive code book is indicated.

FIG. 8 is a graph depicting a result of simulation according to an embodiment of the present disclosure, in which a performance gain of the adaptive code book is indicated. In the simulation, it is assumed that a channel characteristic of the terminal is achieved by adjusting a position of the terminal and an angular spread of antennas of a transmission terminal and an environment of the antennas has the angular spread of 10 degrees and improved correlation. The base station has sixteen analog antennas, and can simultaneously support four terminals with a singular antenna through RF channels with a length L of 4. The number of the analog beams shared by the base station and the terminals is twelve, and each analog beam forming coefficient is configured of a coefficient vector with a length of 16. The common code book is constituted of sixty four vector code words with a length of 4. The number of the analog beams selected for an actual transmission is four.

As shown in FIG. 8, a sum rate 810 of the communication using the adaptive code book designed according to the embodiment described above is very high compared with a sum rate 820 of the communication using the common code book. This results from a reduction of loss of zero-forming beam forming according to the accurate transmission of the channel information.

Figure 9:
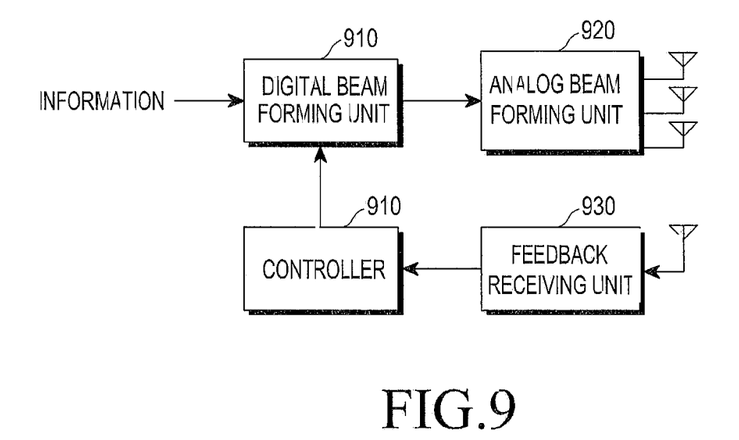
FIG. 9 is a block diagram illustrating a configuration of the base station according to the embodiment of the present disclosure.

FIG. 9 is a block diagram illustrating the configuration of the base station according to the embodiment of the present disclosure.

Referring to FIG. 9, the communication unit (i.e., transceiver) of the base station includes a digital beam forming unit 910 and an analog beam forming unit 920. The digital beam forming unit 910 performs digital beam forming for input information by using a code book and a PMI which are provided by a controller 940. The analog beam forming unit 920 transmits a reference signal through the analog beams by a desired period or by a request in order to support the channel estimation of the terminal, and transmits a digital beam formed signal through a plurality of transmission antennas by carrying the digital beam formed signal on at least one analog beam.

The feedback receiving unit 930 receives at least one of the beam CQI information, the beam preference information and the PMI, which result from the channel estimation, from at least one terminal in the cell, and then transmits the received information to the controller 940. The controller 940 calculates the statistical channel information R based on the beam CQI information or the beam preference information which are provided by the feedback receiving unit 930, and configures and transmits the adaptive code book on the basis of the statistical channel information to the digital beam forming unit 910. Further, when receiving the PMI from the feedback receiving unit 930, the controller 940 transmits the PMI to the digital beam forming unit 910 so that the digital beam forming unit 910 applies the PMI in performing the digital beam forming.

Figure 10:
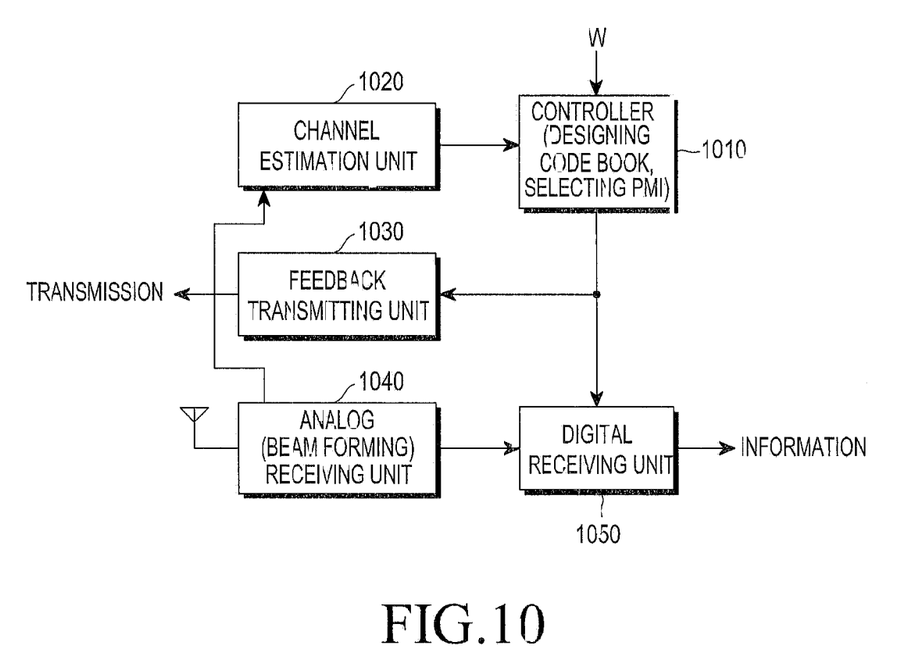
FIG. 10 is a block diagram illustrating a configuration of the terminal according to the embodiment of the present disclosure.

FIG. 10 is a block diagram illustrating a configuration of the terminal according to the embodiment of the present disclosure.

Referring to FIG. 10, the communication unit of the terminal includes an analog receiving unit 1040 and a digital receiving unit 1050. The analog receiving unit 1040 receives a signal transmitted through a plurality of analog beams from the base station, and the channel estimation unit 1020 performs the channel estimation for a frequency band based on a reference signal included in the received signal. The controller 1010 configures the beam CQI information by using the result of the channel estimation, and reports the beam CQI information through the feedback transmission unit 1030 to the base station. Alternatively, the controller 1010 can determine the beam preference information by counting times of selecting each analog beam, and report the beam preference information through the feedback transmission unit 1030 to the base station. Still alternatively, the controller 1010 reports information on a preference beam, which is selected from a plurality of transmitted beams, through the feedback transmission unit 1030 to the base station, so that the base station determines the beam preference information.

In addition, the controller 1010 calculates the statistical channel information R by using the beam CQI information or the beam preference information and the analog beam forming coefficients W obtained from the base station or previously stored. The statistical channel information is used in the controller 1010 to determine the adaptive code book.

Particularly, the controller 1010 configures the adaptive code book by using the statistical channel information and the information on the used analog beam forming coefficients $W_{used}$ provided by the base station. During the actual communication, the controller 1010 receives effective channel information from the channel estimation unit 1020, and determines the PMI indicating the vector code word selected from the adaptive code book based on the effective channel information. The PMI is fed back to the base station by the feedback transmission unit 1030.

Additionally, the PMI can be transmitted to the digital receiving unit 1050. The digital receiving unit 1050 performs signal detection for the analog signals transmitted from the analog receiving unit 1040 by using the PMI received from the controller 1010, so as to restore information transmitted by the base station.

In certain embodiments, the subscriber station and base station described in U.S. Patent Publication No. 20100172290 can be used for the embodiments of the present disclosure, the disclosure of which is incorporated by reference in its entirety.

Although specific exemplary embodiments have been described in the detailed description of the present disclosure, various change and modifications can be made without departing from the spirit and scope of the present disclosure. Therefore, the scope of the present disclosure is not limited to the embodiment described above, and should be defined by the accompanying claims and the equivalents of the claims.

Although the present disclosure has been described with an exemplary embodiment, various changes and modifications can be suggested to one skilled in the art. It is intended that the present disclosure encompass such changes and modifications as fall within the scope of the appended claims.

What is claimed is:

1. A method of performing communication in a multi-stage beam forming system, the method comprising:
   determining statistical channel information that indicates priorities of analog beams transmittable by a base station;
   configuring an adaptive code book for digital beam forming based on the statistical channel information and one or more analog beams used in communication by the base station among the analog beams; and
   performing communication with the base station through the digital beam forming based on the adaptive code book, wherein the adaptive is configured by applying beamforming coefficient of the one or more analog beams to a common codebook.

2. The method as claimed in claim 1, wherein the statistical channel information is determined by using at least one of beam channel quality indicator (CQI) information obtained by measuring a reference signal transmitted through the analog beams from the base station or beam preference information indicating times at which the analog beams are selected as a preferred beam.

3. The method as claimed in claim 1, wherein the statistical channel information is determined by the following equation:

$$R = G(WDW^H)$$

where R means the statistical channel information, W means beam forming coefficients of the analog beams, D indicates one of beam CQI information obtained by measuring a reference signal transmitted through the analog beams from the base station and beam preference information indicating times at which the analog beams are selected as a preferred beam, and G means a Gram Schmidt Orthogonalization operation.

4. The method as claimed in claim 1, wherein configuring the adaptive code book comprises:
   determining adaptive channel information by applying the beam forming coefficients of the one or more analog beams to the statistical channel information; and
   configuring the adaptive code book by applying the adaptive channel information to the common code book.

5. The method as claimed in claim 1, wherein the adaptive code book is expressed by the following equations:

$$C_{adpative} = fN(R_{adaptive}^{1/2} C_{common})$$

$$C_{common} = [c_1, c_2, \ldots, c_M]$$

$$R_{adaptive} = W_{used}^H R W_{used}$$

where $C_{adaptive}$ means the adaptive code book, $C_{common}$ means the predetermined common code book, $C_m$ is an $m^{th}$ vector code word which is a pre-coding vector with a length of L, $W_{used}$ means the beam forming coefficients of the one or more analog beams, and fN means a normalization function.

6. The method as claimed in claim 1, wherein performing the communication with the base station comprises:
    determining effective channel information through channel estimation for the analog beams;
    selecting a pre-coding matrix indicator (PMI) indicating a pre-coding vector for use in the digital beam forming from the adaptive code book based on the effective channel information;
    feeding back the PMI to the base station; and
    receiving a signal transmitted from the base station by using the PMI.

7. The method as claimed in claim 1, wherein performing the communication with the terminal comprises:
    receiving a pre-coding matrix indicator (PMI), that indicates a pre-coding vector selected from the adaptive code book, from the terminal; and
    performing digital beam forming for a signal to be transmitted to the terminal by using the PMI.

8. A terminal for performing communication in a multi-stage beam forming system, the terminal comprising:
    a channel estimator configured to perform channel estimation for analog beams transmittable by a base station;
    a controller configured to determine statistical channel information indicating priorities of the analog beams, and configure an adaptive code book for digital beam forming based on the statistical channel information and one or more analog beams that the base station uses in communication among the analog beams; and
    a communication unit configured to communicate with the base station through the digital beam forming based on the adaptive code book, wherein the adaptive codebook is configured by applying beamforming coefficients of the one or more analog beams to a common codebook.

9. The terminal as claimed in claim 8, wherein the statistical channel information is determined by using at least one of beam channel quality indicator (CQI) information obtained by measuring a reference signal transmitted through the analog beams from the base station or beam preference information indicating times at which the analog beams are selected as a preferred beam.

10. The terminal as claimed in claim 8, wherein the statistical channel information is determined by the following equation:

$$R = G(WDW^H)$$

where R means the statistical channel information, W means beam forming coefficients of the analog beams, D indicates one of beam CQI information obtained by measuring a reference signal transmitted through the analog beams from the base station and beam preference information indicating times at which the analog beams are selected as a preferred beam, and G means a Gram Schmidt Orthogonalization operation.

11. The terminal as claimed in claim 8, wherein the controller is configured to:
    determine adaptive channel information by applying the beam forming coefficients of the one or more analog beams to the statistical channel information; and
    configure the adaptive code book by applying the adaptive channel information to the common code book.

12. The terminal as claimed in claim 8, wherein the adaptive code book is expressed by the following equations:

$$C_{adpative} = fN(R_{adaptive}^{1/2} C_{common})$$

$$C_{common} = [c_1, c_2, \ldots, c_M]$$

$$R_{adaptive} = W_{used}^H R W_{used}$$

where $C_{adaptive}$ means the adaptive code book, $C_{common}$ means the common code book, $C_m$ is an $m^{th}$ vector code word which is a pre-coding vector with a length of L, $W_{used}$ means the beam forming coefficients of the used one or more analog beams, and fN means a normalization function.

13. The terminal as claimed in claim 8, wherein the controller is configured to:
    determine effective channel information through channel estimation for the analog beams;
    select a pre-coding matrix indicator (PMI) indicating a pre-coding vector for use in the digital beam forming from the adaptive code book based on the effective channel information;
    feed back the PMI to the base station; and
    receive a signal transmitted from the base station by using the PMI.

14. A base station for a multi-stage beam forming system, the base station comprising:
    a controller configured to:
        determine statistical channel information indicating priorities of the analog beams transmittable by the base station, and
        configure an adaptive code book for digital beam forming based on the statistical channel information and one or more analog beams used in communication by the base station among the analog beams of the base station; and
    a beamformer configured to communicate with a terminal through the digital beam forming based on the adaptive code book, wherein the adaptive codebook is configured by applying beamforming coefficients of the one or more analog beams to a common codebook.

15. The base station as claimed in claim 14, wherein the statistical channel information is determined by using at least one of beam channel quality indicator (CQI) information obtained by measuring a reference signal transmitted through the analog beams from the base station or beam preference information indicating times at which the analog beams are selected as a preferred beam.

16. The base station as claimed in claim 14, wherein the statistical channel information is determined by the following equation:

$$R = G(WDW^H)$$

where R means the statistical channel information, W means beam forming coefficients of the analog beams, D indicates one of beam CQI information obtained by measuring a reference signal transmitted through the analog beams from the base station and beam preference information indicating times at which the analog beams are selected as a preferred beam, and G means a Gram Schmidt Orthogonalization operation.

17. The base station as claimed in claim 14, wherein the controller is configured to:
   determine adaptive channel information by applying the beam forming coefficients of the one or more analog beams to the statistical channel information; and
   configure the adaptive code book by applying the adaptive channel information to the common code book.

18. The base station as claimed in claim 14, wherein the adaptive code book is expressed by the following equations:

$$C_{adpative} = fN(R_{adaptive}^{1/2} C_{common})$$

$$C_{common} = [c_1, c_2, \ldots, c_M]$$

$$R_{adaptive} = W_{used}^H R W_{used}$$

where $C_{adaptive}$ means the adaptive code book, $C_{common}$ means the common code book, $C_m$ is an $m^{th}$ vector code word which is a pre-coding vector with a length of L, $W_{used}$ means the beam forming coefficients of the used one or more analog beams, and fN means a normalization function.

19. The base station as claimed in claim 14, wherein the controller is configured to:
   receive a pre-coding matrix indicator (PMI), that indicates a pre-coding vector selected from the adaptive code book, from the terminal, and
   perform digital beam forming for a signal to be transmitted to the terminal by using the PMI.

20. A method of performing communication in a multi-stage beam forming system, the method comprising:
   determining statistical channel information that indicates priorities of analog beams transmittable by a base station;
   configuring an adaptive code book for digital beam forming by based on the statistical channel information and one or more analog beams used in communication by the base station among the analog beams of the base station; and
   performing communication with a terminal through the digital beam forming based on the adaptive code book, wherein the adaptive codebook is configured by applying beamforming coefficients of the one or more analog beams to a common codebook.

21. The method as claimed in claim 20, wherein the statistical channel information is determined by using at least one of beam channel quality indicator (CQI) information obtained by measuring a reference signal transmitted through the analog beams from the base station or beam preference information indicating times at which the analog beams are selected as a preferred beam.

22. The method as claimed in claim 20, wherein the statistical channel information is determined by the following equation:

$$R = G(WDW^H)$$

where R means the statistical channel information, W means beam forming coefficients of the analog beams, D indicates one of beam CQI information obtained by measuring by the terminal a reference signal transmitted through the analog beams from the base station and beam preference information indicating times at which the analog beams are selected as a preferred beam, and G means a Gram Schmidt Orthogonalization operation.

23. The method as claimed in claim 20, wherein configuring the adaptive code book comprises:
   determining adaptive channel information by applying the beam forming coefficients of the one or more analog beams to the statistical channel information; and
   configuring the adaptive code book by applying the adaptive channel information to the common code book.

24. The method as claimed in claim 20, wherein the adaptive code book is expressed by the following equations:

$$C_{adpative} = fN(R_{adaptive}^{1/2} C_{common})$$

$$C_{common} = [c_1, c_2, \ldots, c_M]$$

$$R_{adaptive} = W_{used}^H R W_{used}$$

where $C_{adaptive}$ means the adaptive code book, $C_{common}$ means the common code book, $C_m$ is an $m^{th}$ vector code word which is a pre-coding vector with a length of L, $W_{used}$ means the beam forming coefficients of the one or more analog beams, and fN means a normalization function.

* * * * *